United States Patent [19]

Merritt

[11] Patent Number: 4,846,226

[45] Date of Patent: Jul. 11, 1989

[54] COLOR CHANGER

[75] Inventor: James S. Merritt, Lafayette, Colo.

[73] Assignee: Binks Manufacturing Company, Franklin Park, Ill.

[21] Appl. No.: 230,875

[22] Filed: Aug. 11, 1988

[51] Int. Cl.$^4$ .......................................... F16K 11/044
[52] U.S. Cl. .................................. 137/871; 137/869; 137/885; 239/124
[58] Field of Search ............... 137/563, 869, 871, 881, 137/882, 883, 884, 885; 239/112, 124

[56] References Cited

U.S. PATENT DOCUMENTS

| 2,484,622 | 10/1949 | Hartman | 137/869 X |
| 3,403,695 | 10/1968 | Hopkins | 137/881 X |
| 3,558,051 | 1/1971 | Strickler et al. | 239/305 X |
| 4,565,217 | 1/1986 | McIntyre | 137/563 X |
| 4,657,047 | 4/1987 | Kolibas | 137/884 X |

Primary Examiner—A. Michael Chambers
Assistant Examiner—John C. Fox
Attorney, Agent, or Firm—Juettner, Pyle, Lloyd & Verbeck

[57] ABSTRACT

A modular color changer provides selected paint colors for spraying and recirculates nonselected colors. A module is provided for each paint color to be selected, and each module has an inlet for connection with a respective supply of paint, a recirculate outlet, a delivery outlet and a single valve member. The valve member may be selectively engaged with either a first or a second seat, depending upon whether paint at the inlet is to be directed to the recirculate outlet for return to the supply or to the delivery outlet for flow to a paint applicator. Solvent and air purge valves are upstream of the modules for cleaning the color changer of one color of paint in preparation for supplying another.

14 Claims, 3 Drawing Sheets

COLOR CHANGER

BACKGROUND OF THE INVENTION

The invention relates to color changers, and in particular to an improved color changer for selectively supplying different colors of paint to spray coating apparatus.

The prior art contemplates numerous color changers for controlling delivery of paint of selected colors to spraying apparatus, for preventing nonselected colors from being delivered to the apparatus and, usually, for flushing the system between color changes to clean it of one color of paint in preparation for supplying another.

Known changers have certain disadvantages, which often are the result of the characteristics of the paint to be used. For example, some paints include solids that should be maintained in uniform suspension throughout the supply system. If the paint flow is stopped for any significant time, solids tend to settle out of the desired suspension, producing a nonuniform coating when the paint is applied. Unless a color changer is able to maintain an adequate paint flow, it cannot satisfactorily handle such paints.

Other color changers use diaphragm-type valves to control the flow of paints. Such valves are prone to wear and early failure.

One known color changer is taught by U.S. Pat. No. 4,627,465. In the process of providing selected paint colors for spraying, the color changer also continuously recirculates both selected (i.e., those delivered to the paint applicator) and nonselected colors. The color changer is of a modular type, and a module is provided for each color to be selected. To accommodate recirculation of both selected and nonselected colors, each module has three separate and distinct valves and valve actuators, as a result of which a color changer constructed from the modules is mechanically complex and subject to increased risk o failure. For spray coating applications that do not require continuous recirculation of paint to and from the spraying device itself, the color changer is overly complicated.

OBJECTS OF THE INVENTION

An object of the invention is to provide an improved modular color changer that supplies selected paint colors for spraying and continuously recirculates nonselected colors.

Another object is to provide such a color changer that has, in each module, a single, long life valve member that is movable between oopposed seats to accommodate either recirculation of the color of paint connected to the module or supply of the color to a paint applicator.

A further object is to provide a color changer in which there is only a single valve actuator for each module.

Yet another object is to provide a color changer that is structured to facilitate the addition or removal of any number of modules to change the capacity of the color changer.

A still further object is to provide a color changer that includes modular solvent and air purge valves for cleaning the color changer of one color of paint in preparation for supplying another.

SUMMARY OF THE INVENTION

The present invention provides an improved color changer for selectively controlling delivery of paint of various colors to a paint applicator. The color changer has a supply manifold having a passage therein that is connectable to the applicator, and a pair of paint modules connected to the supply manifold for selective delivery of paint to the manifold passage. Each module has a recirculate manifold mounted on the supply manifold, a single valve member selectively movable between and against first and second valve seats, and a valve actuator for moving the valve member. The valve actuator moves the valve member off of the second valve seat and against the first valve seat for recirculation of paint of one color through the second valve seat from and to an associated supply of paint of the one color, and off of the first valve seat and against the second valve seat to interrupt recirculation of paint and to instead deliver paint through the first valve seat to the supply manifold passage for flow to the applicator.

In a preferred embodiment, for each module a vavle chamber is defined between the recirculate manifold of the module and the supply manifold. The valve changer has a paint inlet connectable to the associated paint supply of the module, and the recirculate manifold has a paint outlet also connected to the associated paint supply. The valve chamber connects to the supply manifold passage through the first valve seat and to the recirculate manifold outlet through the second valve seat, and the valve member is disposed in the valve chamber for movement between and against the first and second valve seats.

Advantageously, the color changer comprises a plurality of paint stages, each including a supply manifold portion having a passage therein and a pair of paint modules connected to the supply manifold portion. The plurality of paint stages are connected together in a stack to place the supply manifold portions side-by-side and the supply manifold portion passages end-to-end to form a supply manifold having a passage connectable to the applicator. The color changer can therefore be made to have any desired capacity, depending upon the number of different colors of paint to be delivered to the applicator, simply by interconnecting together an appropriate number of pant stages.

Preferably, a flush stage is at the upstream end of the paint stages for cleaning the color changer between color changes. The flush stage comprises a solvent module and an air module that are alternately actuable to introduce bursts of solvent and air into the supply manifold passage to clean the passage of one color of paint in preparation for supplying a different color.

The foregoing and other objects, advantages and features of the invention will become apparent upon a consideration of the following detailed description, when taken in conjunction with the accompanying drawings.

BRIEF DESCRIPTION OF THE DDRAWINGS

DETAILED DESCRIPTION

Figure 1:
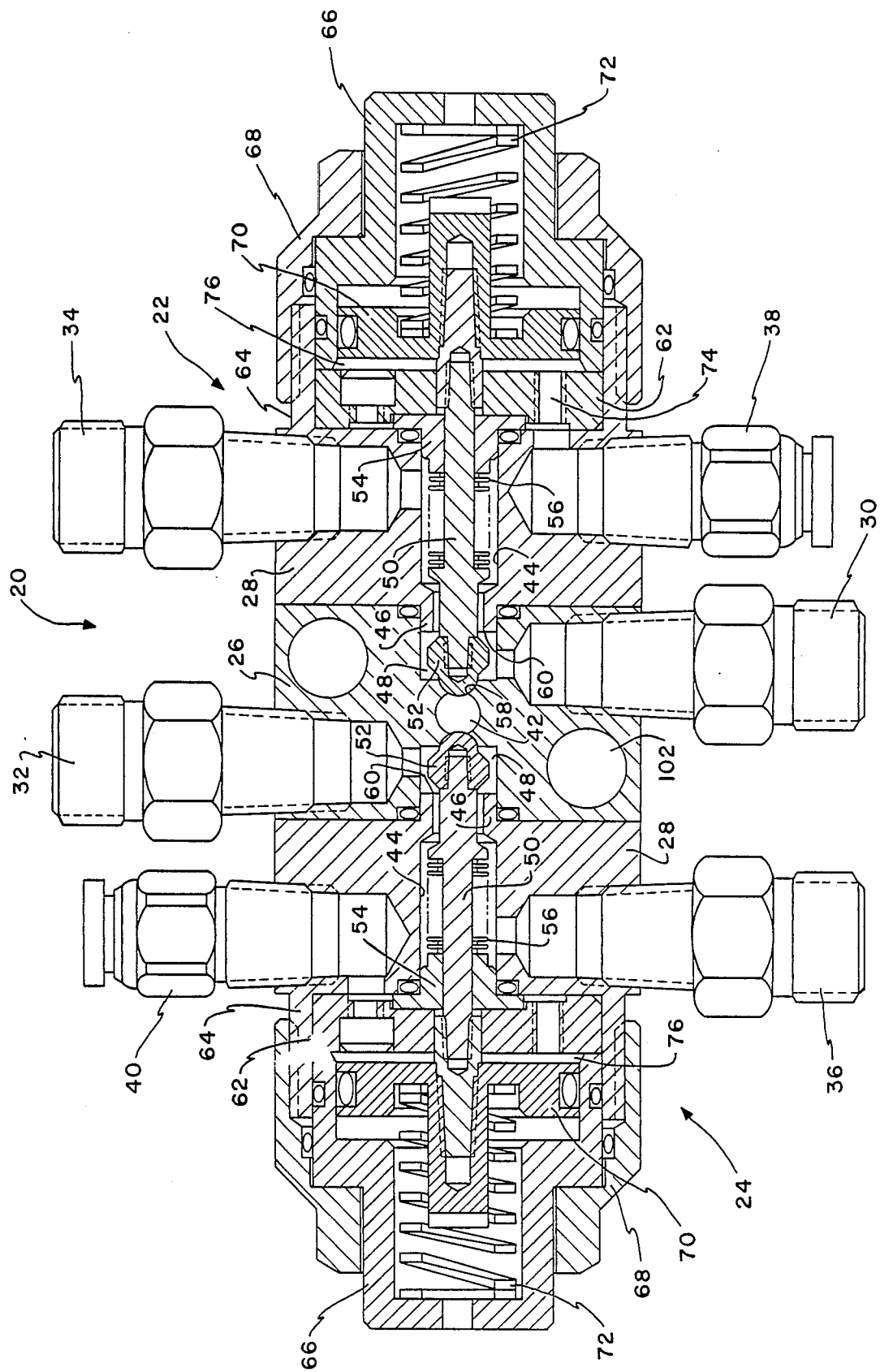
FIG. 1 is a cross sectional side elevation view of a paint stage of a color changer according to the invention.

The color changer of the invention is modular, in that as many paint stages as are required to supply the different colors or types of paint may readily be interconnected to form the color changer. A paint stage is shown in FIG. 1 and indicated generally at 20, and comprises two paint modules, indicated generally at 22 and 24, mounted on opposite sides of a paint supply manifold 26. The modules are identical, and as mounted on the supply manifold each is an inverted mirror image of the other, so like reference numerals will be used to denote like components of each.

The modules 22 and 24 each include a paint recirculate manifold 28 mounted on the supply manifold 26. Paint inlets 30 and 32 for the respective modules 22 and 24 connect with the supply manifold, and paint recirculate outlets 34 and 36 and air inlets 38 and 40 connect with the recirculate manifolds of the respective modules 22 and 24. For the module 22, the paint inlet 30 receives paint of one color under pressure from a supply of the paint and the recriculate outlet 34 connects wih the supply for returning paint to it. For the module 24, the paint inlet 32 receives paint of another color under pressure from a supply of the other color and the recirculate outlet 36 connects with the supply for returning paint to it. A suitable control means (not shown) is provided for selectively applying air under pressure to the air inlets 38 and 40 to cause actuation of the respective modules 22 and 24. As will be described, when a module is actuated paint at its inlet is delivered to a center passage 42 through the supply manifold 26. When a module is deactuated, paint at its inlet is connected to its recirculate outlet for return of the paint to its supply.

Considering just the module 22, it being understood that a like description applies to the module 24, the recirculate manifold 28 has a longitudinal passage 44 terminating in an annular flange 46 received in a valve chamber 48 in the supply manifold 26. A valve stem 50 extends through the passage into the valve chamber and a valve 52 is carried on the stem within the chamber. An opposite end of the valve stem extends through and is slidable in a guide 54 that closes an end of the passage, and a flexible bellows 56 is around the stem and connected at its ends to the stem and guide to seal the guide from paint in the passage. The valve stem is longitudinally movable to move the valve between opposed seats 58 and 60 respectively defined in the supply manifold 26 and recirculate manifold 28. In the leftward position of the valve stem as shown, the valve 52 is moved off of the seat 60 and against the seat 58 to establish communication between the valve chamber and recirculate manifold passage through the seat 60 and to interrupt communication between the valve chamber and supply manifold passage 42 through the seat 58. In a rightward position of the valve stem, he valve is moved off of the seat 58 and against the seat 60 to interrupt communication between the valve chamber and recirculate manifold passage through the seat 60 and to establish communication between the valve chamber and supply manifold passage through the seat 58. Thus, with the valve stem in its leftward position (the module 22 is deactuated) paint at the inlet 30 flows through the seat 60 and passage 44 to the recirculate outlet 34 for return to its supply, while with the valve stem in its rightward position (the module 22 is actuated) paint at the inlet is connected through the seat 58 to the supply manifold passage. The supply manifold passage connects to a paint applicator (not shown) for delivery of paint to the applicator.

A valve actuator for moving the valve 52 between its seats 58 and 60 includes a generally cylindrical guide retainer 62 within an annular flange 64 of the recirculate manifold 28 and through which the valve stem 50 slidably passes. A cylinder 66 extends into the flange into abutment with the guide retainer,and is removably retained in place by a swivel nut 68 threaded onto the flange. A piston 70 in the cylinder is mounted on the end of the valve stem, and a spring 72 normally urges the piston and stem in a direction that moves the valve 52 off of its seat 60 and against its seat 58. To actuate the module 22 and move the valve off of the seat 58 and against the seat 60, a passage 74 extends through the guide retainer between the air inlet 38 and a cylinder space 76, whereby selective application of air under pressure at the air inlet moves the piston against the spring to carry the valve from the seat 58 to the seat 60.

If only two different colors or types of paints are to be selectively delivered to the applicator, the paint stage 20 would be sufficient for the purpose. In this case, the paint inlet 30 of the module 22 would receive one paint under pressure from a first supply and the recirculate outlet 34 would be connected to return paint to the supply, and the paint inlet 32 of the module 24 would receive another paint under pressure from another supply and the recirculate outlet 36 would be connected to return paint to the supply. With each module deactuated so that its valve 52 is against its seat 58, paint at its inlet flows through its seat 60 to its recirculate outlet for return to its associated supply, whereby the paint is continuously recirculated from and to its supply and solids in the paint are maintained in suspension.

To supply a selected one of the paints to the applicator, for example from the first supply, air under pressure is applied at the air inlet 38 to the module 22 to actuate the module and move its valve 52 off of the seat 58 and against the seat 60. When this occurs, paint at the inlet 30 is blocked from flowing to the recirculate outlet 34 through the seat 60, and instead flows through the seat 58 and supply manifold passage 42 to the spraying apparatus. While the module 22 is actuated, the module 24 remains deactuated, so that during connection of the first supply of paint to the spraying apparatus, paint in the second supply continues to be recirculated from and to the supply.

Figure 2:
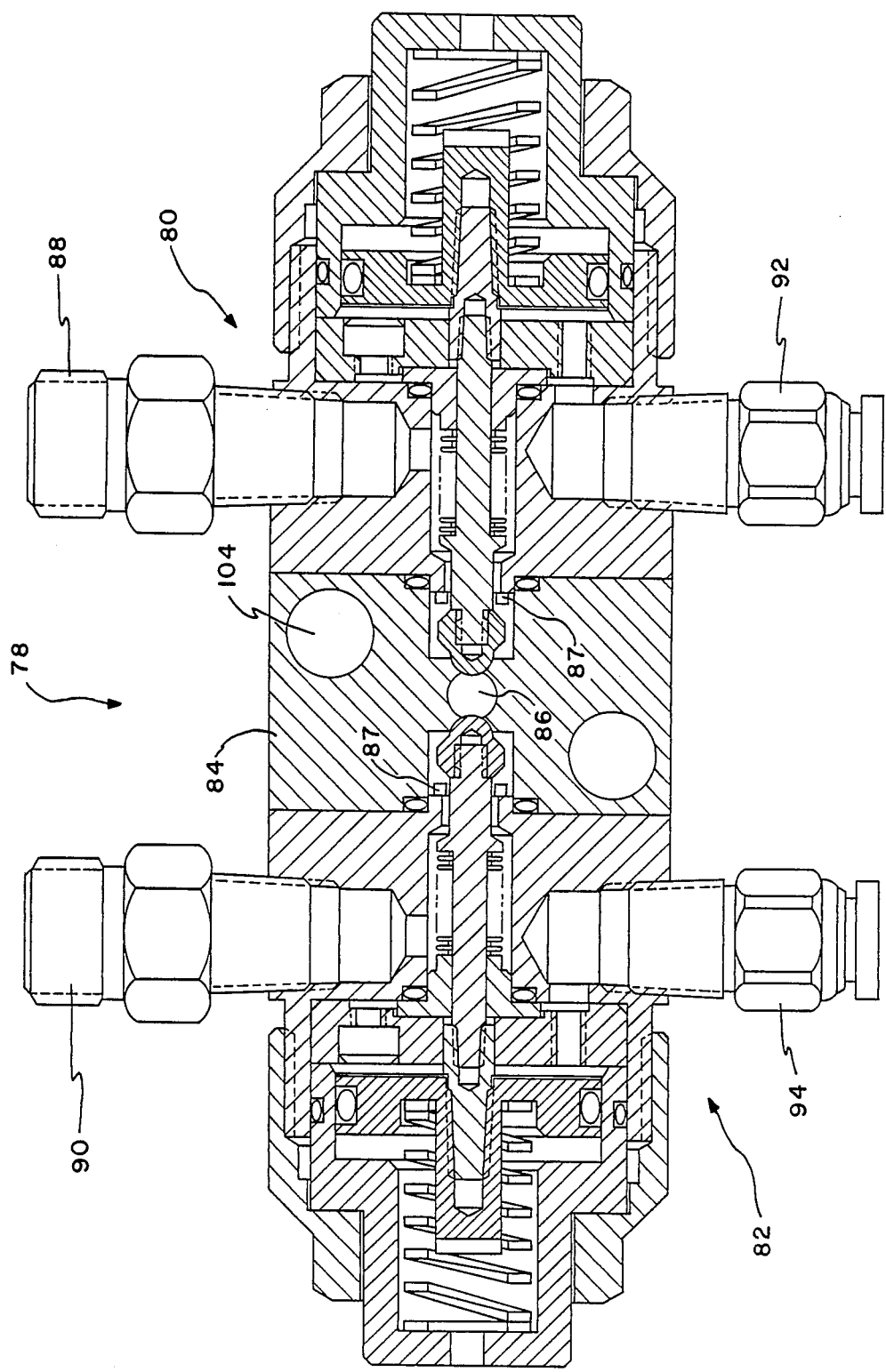
FIG. 2 is a cross sectional view of a flush stage of the color changer.

After completion of delivery of paint of one color to the applicator, to prevent contamination of the next color of paint supplied, it is desirable to clean the supply manifold passage 42 of the one color prior to delivering the next. For the purpose, the color changer also has a flush stage, indicated generally at 78 in FIG. 2. The flush stage has air and solvent modules, indicated generally at 80 and 82, mounted on opposite sides of a flush supply manifold 84 having a center passage 86. The flush stage 78 is similar to the paint stage 20, except that there are no fluid inlets to the flush supply manifold 84, and valve seats 87, that the module valves are moved against in an actuated state of the modules, have passages so that the valves do not form a seal with them. Also, rather than being connected with supplies of paint, the module 80 has a purge air inlet fitting 88 for connection with a supply of air under pressure and the module 82 has a solvent inlet fitting 90 for connection with a supply of solvent under pressure. Similar to the modules of the paint stage, the module 80 has an air inlet fitting 92 for receiving air under pressure to operate its valve fitting 94. When air under pressure is applied at the inlet 92, the module is actuated and air flows from its inlet 88 to and through the supply manifold passage 86. When air under pressure is applied at the inlet 94, the module 82 is actuated and solvent flows from its inlet 90 to and through the supply manifold passage 86. When the modules are deactuated, there is no recirculation of air and solvent to and from their respective supplies.

Figure 3:
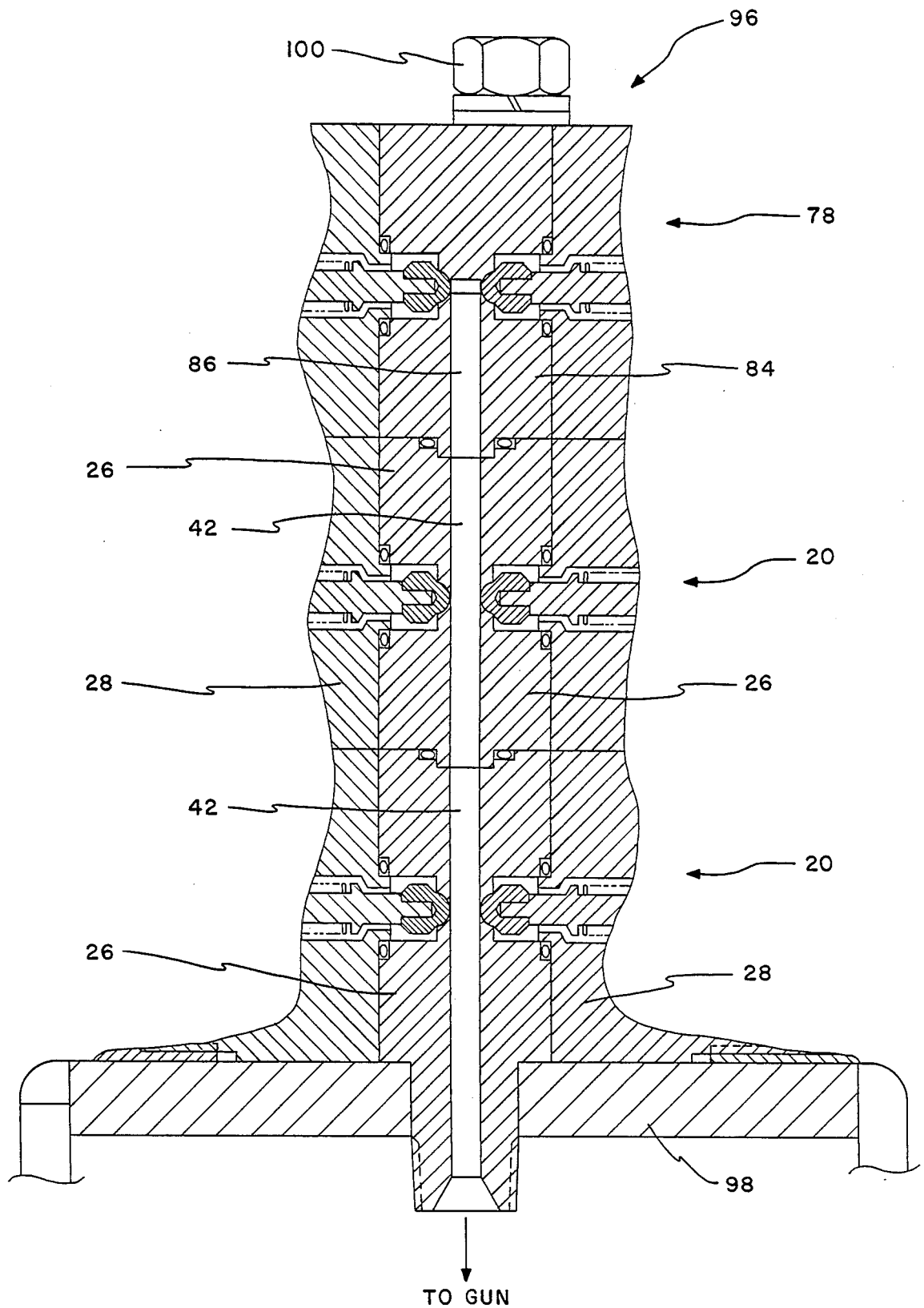
FIG. 3 is a fragmentary, cross sectional longitudinal view of two paint stages and one flush stage connected to form a color changer.

As many paint stages 20 as are necessary to selectively supply any number of different colors of paint may be connected together and to a flush stage 78 to provide a color changer of desired capacity. For example, FIG. 3 illustrates in fragmentary fashion a color changer, indicated generally at 96, for selectively supplying any one of four different colors of paint to a spray gun. The color changer is mounted on a platform 98, and includes two paint stages 20, and therefore four paint modules, mounted in stacked relationship one on top of the other with the center passages 42 through their supply manifolds 26 in end-to-end alignment. The color changer also includes a flush stage 78, upstream of the paint stages, mounted with its supply manifold passage 86 in communication with the passages 42. The paint and flush stages may readily be placed side-by-side and drawn together by tie rods, such as by a tie rod 100 extended through aligned passages 102 and 104 in the paint supply and flush supply manifolds 26 and 84. As connected, the paint and flush stage supply manifolds 26 and 84 define portions of an overall color changer supply manifold.

With the paint and flush stages 20 and 78 connected to form the color changer 96, any selected one of four colors of paint may readily be delivered to a spray gun simply by actuating the paint module connected to the supply of the selected color to cause the color to flow into the paint supply manifold passage 42. Only one module at a time is actuated to avoid mixing of colors, and while the one module is actuated the remainder are deactuated for recirculation of their associated colors of paint from and to their respective supplies.

At the end of delivery of the selected color of paint, the paint module associated with the color is deactuated and, while all of the paint modules remain deactuated, the color changer is cleaned in preparation for supplying the next selected color. To clean the color changer, the air module 80 of the flush stage 78 is actuated to introduce air into the passages 86 and 42 to move paint remaining in the passages, and in a supply line to the spray gun, to the gun. Advantageously, the module that was actuated to deliver the selected color is deactuated prior to termination of spraying of the color, so that the air delivers paint remaining in the line to the gun for being sprayed. Alternatively, and although less economical to do so, upon actuation of t e air module 80, a dump valve at the spray gun may be opened for discharge of paint remaining in the color changer and line.

After excess paint is removed from the color changer and supply line, the solvent and air modules 82 and 80 are alternately actuated to introduce alternate bursts of solvent and air into and through the supply manifold passages 86 and 42 and the supply line to clean the same of the previously supplied color of paint in preparation for delivery of the next selected color. At the end of the flushing operation, the paint module associated with the next selected color is actuated.

The invention therefore provides an improved color changer that is capable of delivering substantially any number of different colors of paint while providing for recirculation of all nonselected colors. Using identical paint stages 20 having identical paint modules 22 and 24 faciltates the addition of colors or types of paint to a basic color changer, with minimal additional piping and assembly being required. The paint modules have an improved structure as compared with those of prior color changers, each having only a single, long life valve member that is movable between opposed seats to accommodate either recirculation of the color of paint connected to the module or supply of the color to a spray device.

While one embodiment of the invention has been described in detail, various modifications and other embodiments thereof may be devised by one skilled in the art without departing from the spirit and scope of the invention, as defined in the appended claims.

What is claimed is:

1. A color changer for selectively controlling delivery of paint of various colors to a paint applicator, said color changer comprising a supply manifold having a paint delivery passage adapted for connection to the applicator; and a plurality of paint modules connected to said supply manifold and adapted for connection to associated paint supplies, each said module having a single valve member movable between a first position for recirculating paint from and to its associated supply of paint and a second position for connecting its associated supply of paint to said supply manifold passage for delivery of paint to the applicator and wherein, for each said paint module, there are first and second valve seats and said single valve member in said first position is moved against said first valve seat and away from said second valve seat to establsh a path through said second valve seat for recirculation of paint from and to the associated supply, and said single valve member in said second position is moved against said second valve seat and away from said first valve seat to interrupt recirculation of paint through said second valve seat and establish a path through said first valve seat for a flow of paint from the associated supply to said supply manifold passage for delivery to the applicator.

2. A color changer as in claim 1, wherein, for each said paint module, said first valve seat is on said supply manifold and said second valve seat is on said module.

3. A color changer as in claim 1, including, for each said module, a separate valve actuator for selectively moving said single valve member between said first and second positions.

4. A color changer as in claim 3, wherein each said valve actuator normally moves said single valve member of its associated module to said first position and is selectively operable to move said single valve member to said second position.

5. A color changer as in claim 1, including a solvent module and an air module couple to said supply manifold passage upstream from said paint modules, each said solvent and air module having a selectively operable, normally closed valve for selectively connecting a source of solvent and a source of pressurized air to said supply manifold passage.

6. A color changer for selectively controlling delivery of paint of various colors to a paint applicator, said color changer comprising a plurality of paint stages, each said paint stage including a supply manifold portion having a passage and a pair of paint modules connected with said supply manifold portion and adapted for connection with associated paint supplies, said plurality of paint stages being connected together in a stack to place said supply manifold portions side-by-side and said supply manifold portion passages end-to-end to form a composite supply manifold having a composite passage for connection to the applicator, each said module having first and second valve seats and a single valve member movable against said first valve seat and away from said second valve seat to establish a path through said second valve seat for recirculating paint from and to its associated supply and against said second valve seat and away from said first valve seat to interrupt recirculation of paint through said second valve seat and establish a path through said first valve seat for connecting its associated supply of paint to said composite supply manifold passage for delivery of paint through said passage to the applicator.

7. A color changer for selectively controlling delivery of paint of various colors to a paint applicator, said color changer comprising a supply manifold having a passage therein connectable to the applicator; and a pair of paint modules connected to said supply manifold for selective delivery of paint to said supply manifold passage, each said paint module being adapted for connection to an associated paint supply and including a recirculate manifold connected to said supply manifold, a single valve member movable between and against first and second opposed valve seats, and a valve actuator for selectively moving said valve member off of said second valve seat and against said first valve seat for recirculation of paint through said second valve seat from and to the associated supply of paint, and off of said first valve seat and against said second valve seat to interrupt recirculation of paint through said second valve seat and to deliver paint from the associated supply through said first valve seat to said supply manifold passage for flow to the applicator.

8. A color changer as in claim 7, wherein, for each said module, a valve chamber is defined between said module recirculate manifold and said supply manifold, said valve chamber has a paint inlet connectable to the associated paint supply, said recirculate manifold has a paint outlet connected to the associated paint supply, said valve chamber connects to said supply manifold passage through said first valve seat and to said recirculate manifold paint outlet through said second valve seat, and said valve member is disposed in said valve chamber for movement between and against said first and second valve seats.

9. A color changer as in claim 8, wherein, for each said module, said valve member comprises a valve disposed in said valve chamber and a stem carrying said valve, said stem extends from said valve through said recirculate manifold and said valve actuator is connected to said stem for moving said stem and thereby said valve.

10. A color changer as in claim 9, wherein, for each said module, said valve actuator comprises a pneumatic cylinder.

11. A color changer as in claim 9, wherein said supply manifold is generally rectangular and said pair of modules are mounted on opposite sides of said supply manifold.

12. A color changer as in claim 8, wherein said valve chamber paint inlet comprises a paint inlet to said supply manifold.

13. A color changer as in claim 8, wherein, for each said module, said first valve seat is on said supply manifold and said second valve seat is on said recirculate manifold.

14. A color changer as in claim 7, wherein, for each said module, said valve actuator normally moves said valve member against said first valve seat and is selectively operable to move said valve member off of said first and against said second valve seat, whereby said module normally provides for recirculation of paint from and to its associated paint supply, but upon selective operation of said valve actuator said module connects paint from its associated supply to said supply manifold passage for delivery to the applicator.

* * * * *